US008681860B2

(12) United States Patent
Tsubaki

(10) Patent No.: US 8,681,860 B2
(45) Date of Patent: Mar. 25, 2014

(54) MOVING PICTURE COMPRESSION APPARATUS AND METHOD OF CONTROLLING OPERATION OF SAME

(75) Inventor: Hisayoshi Tsubaki, Asaka (JP)

(73) Assignee: Facebook, Inc., Menlo Park, CA (US)

( * ) Notice: Subject to any disclaimer, the term of this patent is extended or adjusted under 35 U.S.C. 154(b) by 1400 days.

(21) Appl. No.: 12/057,077

(22) Filed: Mar. 27, 2008

(65) Prior Publication Data

US 2008/0267284 A1 Oct. 30, 2008

(30) Foreign Application Priority Data

Mar. 28, 2007 (JP) ................................. 2007-083622

(51) Int. Cl.
*H04N 7/12* (2006.01)
*G06K 9/36* (2006.01)

(52) U.S. Cl.
USPC ...................................... 375/240.12; 382/236

(58) Field of Classification Search
None
See application file for complete search history.

(56) References Cited

U.S. PATENT DOCUMENTS

| 5,293,434 | A | * | 3/1994 | Feig et al. ...................... 382/234 |
| 5,592,226 | A | * | 1/1997 | Lee et al. .................. 375/240.14 |
| 5,835,149 | A | * | 11/1998 | Astle ......................... 375/240.05 |
| 6,266,447 | B1 | * | 7/2001 | Hoshi et al. .................... 382/236 |
| 6,463,101 | B1 | * | 10/2002 | Koto .......................... 375/240.13 |
| 6,618,728 | B1 | * | 9/2003 | Rail .............................. 382/232 |
| 6,658,199 | B1 | * | 12/2003 | Hallberg ...................... 386/346 |
| 6,983,015 | B1 | * | 1/2006 | Saunders et al. ............ 375/240.1 |
| 7,061,982 | B2 | * | 6/2006 | Ueda ......................... 375/240.25 |
| 7,769,084 | B1 | * | 8/2010 | Pun et al. .................. 375/240.03 |
| 2002/0021756 | A1 | * | 2/2002 | Jayant et al. .............. 375/240.16 |
| 2003/0039308 | A1 | * | 2/2003 | Wu et al. ................... 375/240.12 |
| 2004/0165665 | A1 | * | 8/2004 | Harumoto et al. ........ 375/240.26 |
| 2005/0094733 | A1 | * | 5/2005 | Daniell ...................... 375/240.25 |
| 2006/0117357 | A1 | * | 6/2006 | Surline ...................... 375/240.24 |
| 2007/0025615 | A1 | * | 2/2007 | Zhou et al. ..................... 382/173 |
| 2007/0116115 | A1 | * | 5/2007 | Tong et al. ............... 375/240.03 |

(Continued)

FOREIGN PATENT DOCUMENTS

| JP | 9-298749 A | 11/1997 |
| JP | 11-341488 A | 12/1999 |

(Continued)

OTHER PUBLICATIONS

Notification of Reasons for Refusal, dated Oct. 5, 2010, for corresponding Japanese Patent Application No. 2007-083622.

*Primary Examiner* — Gregory Sefcheck
*Assistant Examiner* — Joshua Smith
(74) *Attorney, Agent, or Firm* — Sheppard Mullin Richter & Hampton LLP

(57) ABSTRACT

In principle, an I-frame is inserted every 50 frames and other frames are made P-frames. If the maximum amount of data that can be received by a terminal device to which a transmission is to be made is 300 KB, then frames up to a $144^{th}$ frame for which the amount of data after compression will not exceed 300 KB is adopted as a first partitioned moving picture file. Since the $145^{th}$ frame is the leading frame of the next partitioned moving picture file, it is made an I-frame. Frames from the $145^{th}$ frame to a $289^{th}$ frame are made a second partitioned moving picture file, and frames from a $290^{th}$ frame to a $411^{th}$ frame are made a third partitioned moving picture file. Since the leading frame of a partitioned moving picture file represents one complete frame, the moving picture can be reproduced and the number of partitions can be reduced.

20 Claims, 6 Drawing Sheets

(56) References Cited

U.S. PATENT DOCUMENTS

2007/0296854 A1* 12/2007 Berkey et al. .............. 348/412.1
2008/0151998 A1*  6/2008 He ........................... 375/240.03
2008/0181302 A1*  7/2008 Demircin et al. ........ 375/240.06
2008/0232468 A1*  9/2008 Kwon et al. ............. 375/240.12

FOREIGN PATENT DOCUMENTS

| JP | 2002-232869 A | 8/2002 |
| JP | 2004-222124 A | 8/2004 |
| JP | 2006-285586 A | 10/2006 |

* cited by examiner

MOVING PICTURE COMPRESSION APPARATUS AND METHOD OF CONTROLLING OPERATION OF SAME

BACKGROUND OF THE INVENTION

1. Field of the Invention

This invention relates to an apparatus for compressing a moving picture and to a method of controlling the operation of this apparatus.

2. Description of the Related Art

Services for transmitting moving picture files to a mobile telephone are presently available, and mobile telephones come in a wide variety of models. Often the amount of data that can be received in a moving picture file, the format of a moving picture file that can be reproduced and the image display size differ for every model of mobile telephone. In order to so arrange it that a moving picture file can be reproduced by a mobile telephone, there is a technique that decides the amount of data that is to be transmitted in a moving picture file (see Japanese Patent Application Laid-Open No. 9-298749), a technique for generating a plurality of items of moving picture data having different bit rates and transmitting the moving picture data that conforms to the band that is utilizable on the network (see Japanese Patent Application Laid-Open No. 11-341488), a technique for transmitting moving picture data in a compressed format that is based upon a request from a user (see Japanese Patent Application Laid-Open No. 2002-232869), and a technique for generating moving picture data upon deciding moving picture generating parameters that conform to the model of a client terminal device by discriminating the model of the device (see Japanese Patent Application Laid-Open No. 2004-222124).

Since the amount of data in a moving picture file capable of being received by a mobile terminal such as a mobile telephone often is small, it is required that a moving picture file containing a comparatively large amount of data be partitioned in order to for it to be received. Depending upon the format of the moving picture file, however, there are instances where the file can only be partitioned at the location of a specific frame. This means there are occasions where a moving picture file cannot be simply partitioned in such a manner that large amount of data can be received by a terminal device.

SUMMARY OF THE INVENTION

Accordingly, an object of the present invention is to so arrange it that a moving picture file can be partitioned in such a manner that a large amount of data can be received by a terminal device.

In accordance with the present invention, the foregoing object is attained by providing an apparatus for compressing a moving picture, comprising: a compressing device, to which subject-image data representing the image of a subject is input one frame at a time from a moving picture file representing a moving picture composed of a number of frames of subject images (where each frame is one complete frame of a subject image), for executing complete compression processing such that the subject-image data that has been input will become one complete frame of a subject image if the data is subject-image data that represents a subject image from a reference frame (which may be a frame of a prescribed ordinal number from the reference frame or a prescribed frame that is variable), and for executing differential compression processing in such a manner that the subject-image data that has been input will indicate differential information relative to the preceding frame if the data is not subject-image data representing a subject image of a frame of a prescribed ordinal number; an accumulating device for accumulating amount of data from the reference frame, wherein the amount of data is the amount of subject-image data that has undergone complete compression processing and amount of subject-image data that has undergone differential compression processing; a determining device for determining whether an accumulated value obtained from the accumulating device has exceeded a value calculated from an amount of data receivable by a terminal device to which a moving picture file is to be transmitted; and a control device, responsive to a determination by the determination device that the accumulated value obtained from the accumulating device has exceeded the receivable amount of data, for controlling the compressing device in such a manner that complete compression processing is applied to subject-image data representing a subject image of a frame that has exceeded the receivable amount of data owing to execution of compression processing, and for resetting the accumulated value from the accumulating device.

The present invention also provides an operation control method suited to the above-described apparatus for compressing a moving picture. Specifically, the present invention provides a method of controlling operation of an apparatus for compressing a moving picture, comprising the steps of: inputting subject-image data representing the image of a subject one frame at a time from a moving picture file representing a moving picture composed of a number of frames of subject images (where each frame is one complete frame of a subject image), executing complete compression processing in such a manner that the subject-image data that has been input will become one complete frame of a subject image if the data is subject-image data that represents a subject image of a frame of a prescribed ordinal number from a reference frame, and executing differential compression processing in such a manner that the subject-image data that has been input will indicate differential information relative to the preceding frame if the data is not subject-image data representing a subject image of a frame of a prescribed ordinal number; accumulating amount of data from the reference frame, wherein the amount of data is the amount of subject-image data that has undergone complete compression processing and amount of subject-image data that has undergone differential compression processing; determining whether an obtained accumulated value has exceeded a value calculated from an amount of data receivable by a terminal device to which a moving picture file is to be transmitted; and in response to a determination that the accumulated value obtained has exceeded the receivable amount of data, controlling the compressing step in such a manner that complete compression processing is applied to subject-image data representing a subject image of a frame that has exceeded the receivable amount of data owing to execution of compression processing, and resetting the accumulated value from the accumulating step.

In accordance with the present invention, a subject image of a frame of a prescribed ordinal number from a reference frame is subjected to complete compression processing so as to become one complete frame of the subject image. The subject image of a frame other than the frame of the prescribed ordinal number is subjected to differential compression processing so as to indicate differential information relative to the preceding frame. The subject-image data that has been subjected to complete compression processing and the subject-image data that has been subjected to differential compression processing is accumulated. If the accumulated value exceeds the amount of data receivable by a terminal device to which a moving picture file is to be transmitted, then complete compression processing is applied to the subject image of the frame that has exceeded the receivable amount of data owing to compression, and the accumulated value is reset.

In a case where a moving picture file that has thus been subjected to complete compression processing or differential compression processing is partitioned, one complete frame of the subject image cannot be reproduced merely by differential information. It is required that the moving picture file be partitioned at a location of the subject image that has undergone complete compression processing. According to the present invention, when the accumulated value of compressed subject-image data exceeds the amount of data that can be received by a terminal device to which a moving picture is to be transmitted, complete compression processing is applied to the subject image of the frame that has exceeded the receivable amount of data. Thus, a partitioned file having the maximum amount of data within the receivable amount of data can be transmitted to the terminal device. The number of partitions of a moving picture file can be reduced.

By way of example, the determining device determines whether the accumulated value obtained from the accumulating device has exceeded a first amount of data receivable by a first terminal device to which a moving picture file is to be transmitted, or a second amount of data receivable by a second terminal device to which a moving picture file is to be transmitted. Further, the control device has a first control device, responsive to a determination by the determining device that the accumulated value has exceeded the first receivable amount of data, for controlling the compressing device in such a manner that complete compression processing is applied to subject-image data representing a subject image of a frame that has exceeded the first receivable amount of data owing to execution of compression processing, and for resetting the accumulated value, and a second control device, responsive to a determination by the determining device that the accumulated value has exceeded the second receivable amount of data, for controlling the compressing device in such a manner that complete compression processing is applied to subject-image data representing a subject image of a frame that has exceeded the first receivable amount of data owing to execution of compression processing, and for resetting the accumulated value.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
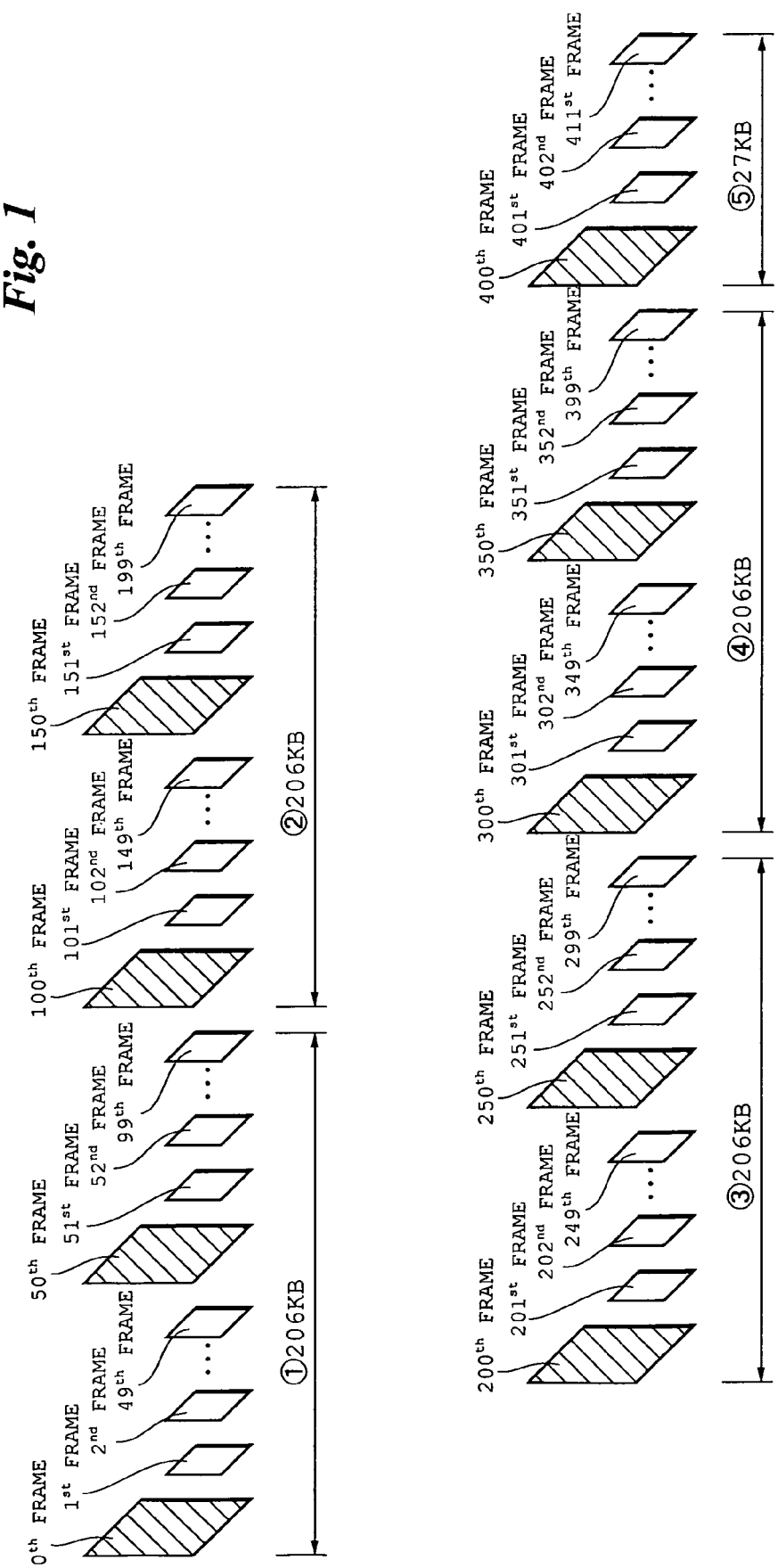
FIGS. 1 and 2 illustrate examples of schemes for compressing moving pictures.

FIG. 1 is a conceptual view of a moving picture that has been compressed by a compression scheme based upon MPEG (Moving Picture Experts Group).

Compression based upon MPEG utilizes both spatial compression and temporal compression. With MPEG compression, an I-frame (indicated by the hatching) is generated at a rate of one per plurality of frames. The other generated frames are P-frames. The I-frame is produced by spatial compression and is the result of intraframe coding using only data within the frame. One complete frame of a subject image can be reproduced using the I frame alone (complete compression processing). The P-frame is produced by temporal (interframe) compression; it indicates differential information relative to the preceding frame (differential compression processing). One complete frame of a subject image cannot be reproduced with just a P-frame but it can be reproduced utilizing the subject image of the preceding frame. Consider a moving picture in which the amount of code of an I-frame is 5 KB, the amount of code of a P-frame is 2 KB and there are 412 frames from a $0^{th}$ frame to a $411^{th}$ frame. Assume also that a terminal device that transmits a moving picture file representing such a moving picture is capable of receiving data up to a maximum amount of 300 KB. Further, assume that the I-frame is inserted every 50 frames.

Since the I-frame is inserted every 50 frames, a $0^{th}$ frame, $50^{th}$ frame, $100^{th}$ frame, $150^{th}$ frame, $200^{th}$ frame, $250^{th}$ frame, $300^{th}$ frame, $350^{th}$ frame and $400^{th}$ frame are I-frames. The remaining frames are P-frames. Since an I-frame is 5 KB and a P-frame is 2 KB, the amount of data in a moving picture file representing a 412-frame moving picture of $0^{th}$ to $411^{th}$ frames is a total of 801 KB. This cannot be received by the terminal device that is capable of receiving data up to a maximum amount of 300 KB. Consequently, the moving picture file is partitioned and the plurality of moving picture files thus partitioned are transmitted to the terminal device.

One complete frame of a still image cannot be reproduced with just a P-frame. If a moving picture file in which I- and P-frames are mixed is partitioned, therefore, an I-frame must be made the initial frame of a partitioned moving picture file. A moving picture file cannot be partitioned at the location of a P-frame. Therefore, in a case where a moving picture file is transmitted to a terminal device that can receive data up to the maximum amount of 300 KB, it is necessary to generate five partitioned moving picture files, namely first, second, third, fourth and fifth partitioned moving picture files, composed of the $0^{th}$ to $99^{th}$ frames, $100^{th}$ to $199^{th}$ frames, $200^{th}$ to $299^{th}$ frames, $300^{th}$ to $399^{th}$ frames and $400^{th}$ to $411^{th}$ frames, respectively. These five partitioned moving picture files are transmitted to the terminal device one after another.

In this embodiment, the number of moving picture files partitioned is reduced. Although partitioned moving picture files are transmitted to a terminal device in response to a request from the user of the terminal device, the number of moving picture files partitioned is reduced. This means that the number of times requests are issued from the user can be reduced and that the burden upon the user can be alleviated.

Figure 2:
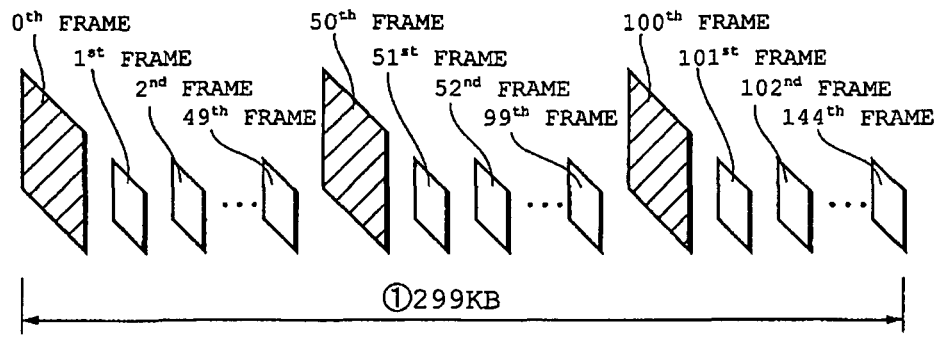
Figure 2:
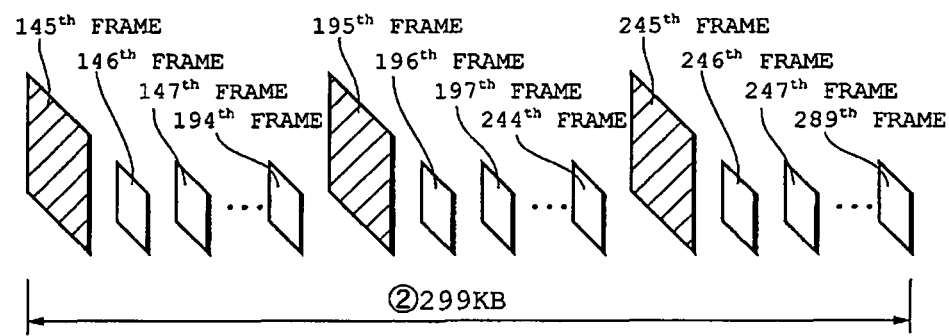
Figure 2:
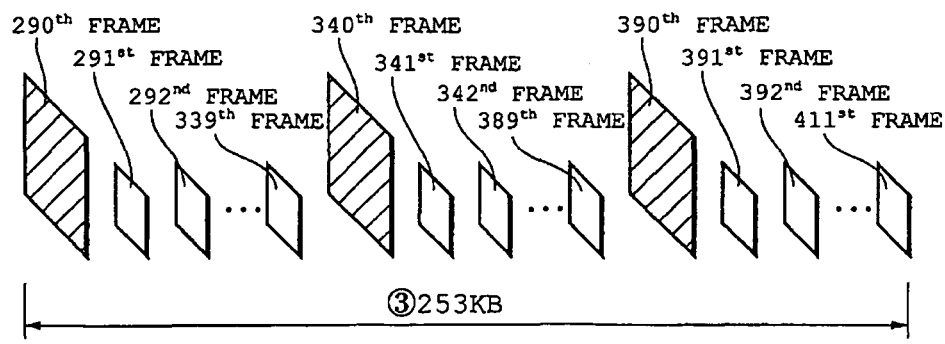

FIG. 2 is a conceptual view of a moving picture that has been compressed by the compression scheme according to this embodiment.

With the compression scheme according to this embodiment, a moving picture file is partitioned so as to maximize the amount of data that can be received by a terminal device to which a transmission is to be made. The leading frame of a moving picture file that has been partitioned is made an I-frame. This serves as the reference frame. In a manner similar to that described above, in principle an I-frame is inserted every 50 frames and P-frames are inserted between I-frames.

Since an I-frame is inserted every 50 frames, the I-frame is inserted as $0^{th}$, $50^{th}$ and $100^{th}$ frames and the P-frames are inserted between these I-frames. The total amount of data from the $0^{th}$ frame to the $145^{th}$ frames is 299 KB, which is calculated as follows: [amount of data (=5 KB) of the $0^{th}$ frame]+[amount of data (=49×2=92 KB) of the $1^{st}$ to $49^{th}$ frames]+[amount of data (=5 KB) of the $50^{th}$ frame]+[amount of data (=49×2=92 KB) of the $51^{st}$ to $99^{th}$ frames]+[amount of data (=5 KB) of the $110^{th}$ frame]+[amount of data (=44×2=88 KB) of the $101^{st}$ to $144^{th}$ frames]. If a P-frame is generated from the $145^{th}$ frame, there will be an increase of 2 KB and, consequently, the 300 KB that can be received by the terminal device will be exceeded. Therefore, the first partitioned moving picture file is generated using the $0^{th}$ to $144^{th}$ frames as one unit.

Since the $145^{th}$ frame becomes the leading frame of the next partitioned file, this frame is made an I-frame in such a manner that one frame of a complete subject image is generated with just the $145^{th}$ frame. The I-frame is again inserted every 50 frames using the $145^{th}$ frame, which is the leading frame of the next partitioned file, as the reference. Similarly, the $145^{th}$, $195^{th}$ and $245^{th}$ frames are made I-frames and P-frames are inserted between these I-frames. The total amount of data from the $145^{th}$ to the $289^{th}$ frames is 299 KB. The second partitioned moving picture file is generated using the $145^{th}$ to $289^{th}$ frames as one unit.

Since the $290^{th}$ frame becomes the leading frame of the next partitioned file, this frame is made an I-frame. The I-frame is again inserted every 50 frames using the $290^{th}$ frame as the reference. The $290^{th}$, $340^{th}$ and $390^{th}$ frames are made I-frames. The total amount of data from the $290^{th}$ to the $411^{th}$ frames is 253 KB. The third partitioned moving picture file is generated using the $290^{th}$ to $411^{th}$ frames as one unit.

Thus, in accordance with this embodiment, a moving picture file can be partitioned into three portions.

Figure 3:
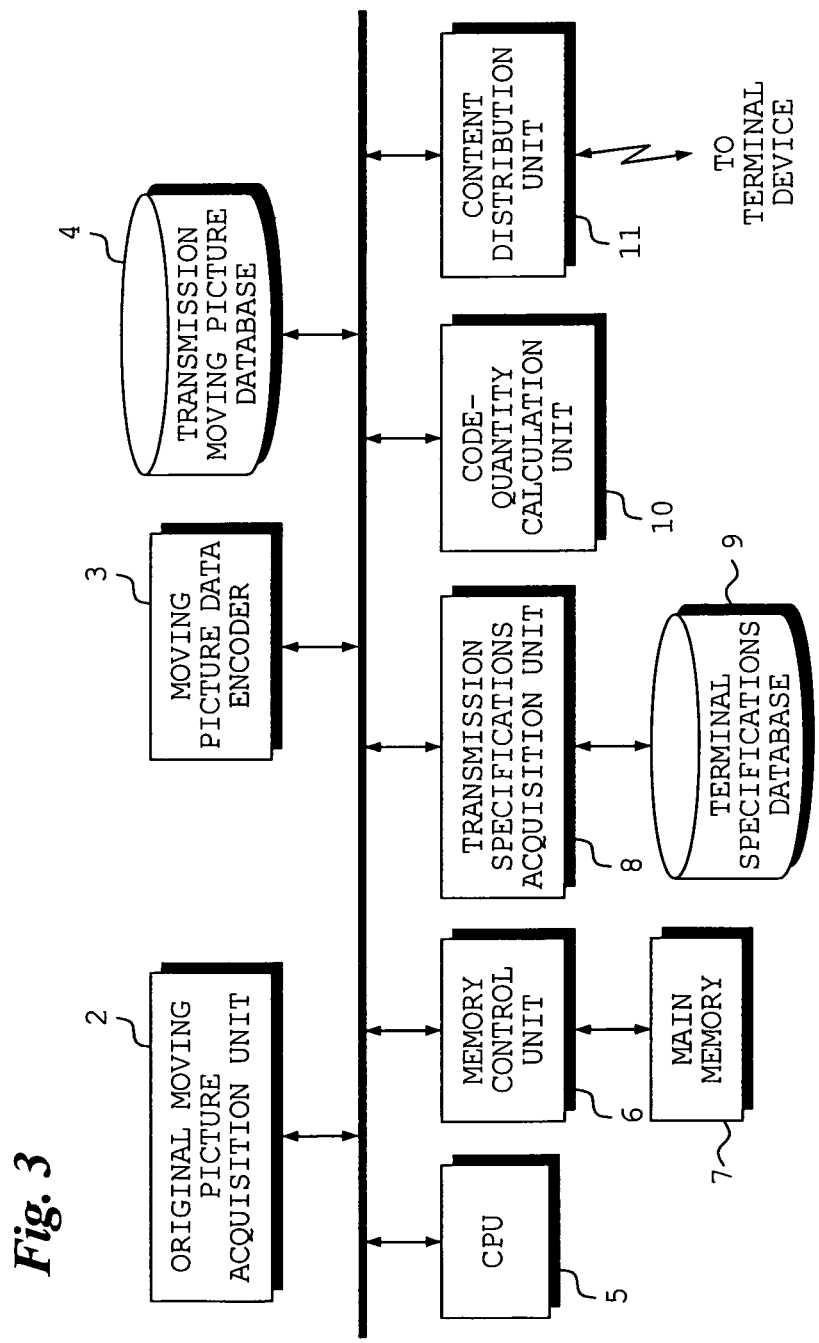
FIG. 3 is a block diagram illustrating the electrical configuration of an apparatus for compressing a moving picture.

FIG. 3 is a block diagram illustrating the electrical configuration of a moving picture compression apparatus 1.

The operation of the overall moving picture compression apparatus 1 is controlled by a CPU 5. The moving picture compression apparatus 1 includes a main memory 7 for storing data, etc., and a memory control unit 6 for controlling the main memory 7.

The moving picture compression apparatus 1 includes a terminal specifications database 9. Specifications (maximum receivable amount of data, etc.) of a terminal device to which a transmission is to be made have been stored in the terminal specifications database 9 for every terminal device. The specifications data that has been stored in the terminal specifications database 9 is read by a transmission specifications acquisition unit 8.

Original moving picture data, which has not been compressed, is acquired by an original moving picture acquisition unit 2. If the original moving picture acquisition unit 2 is a communication unit, then the uncompressed moving picture data may be transmitted from another apparatus, or moving picture data that has been recorded on a digital medium such as a disk may be read. Moving picture data that has been acquired by the original moving picture acquisition unit 2 is encoded (compressed) by a moving picture data encoder 3 in the manner described above. The amount of data encoded is calculated by a code-quantity calculation unit 10, and the moving picture data (moving picture file) is partitioned in such a manner that the amount will fall below the amount of data capable of being received by the terminal device to which a transmission is to be made. The partitioned moving picture data is stored in a transmission moving picture database 4.

If a terminal device issues a request for transmission of moving picture data, partitioned moving picture data that has been stored in the transmission moving picture database 4 is transmitted to this terminal device by a content distribution unit 11.

Figure 4:
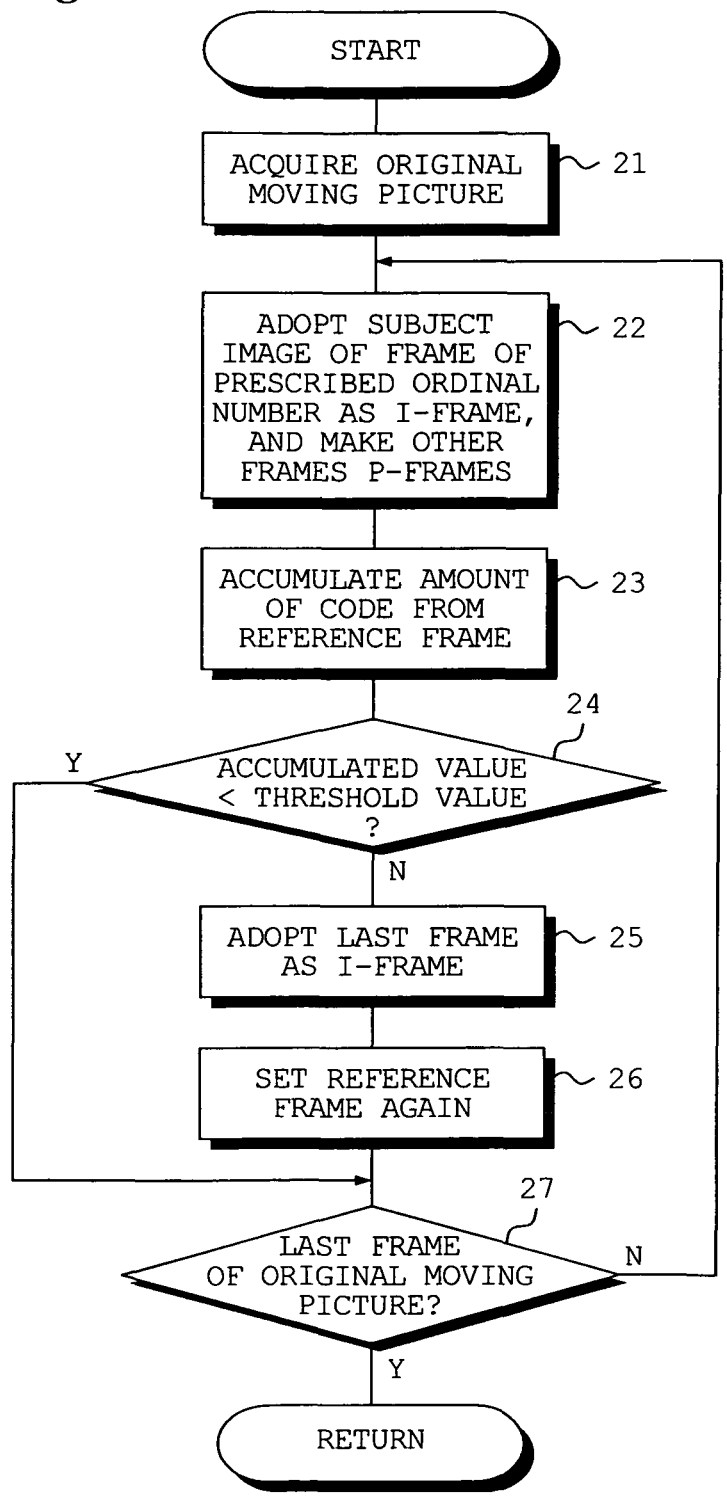
FIG. 4 is a flowchart illustrating processing executed by an apparatus for compressing a moving picture.

FIG. 4 is a flowchart illustrating processing executed by the moving picture compression apparatus.

Original moving picture data is acquired (step 21), as set forth above. A number of frames of a subject image represented by the uncompressed original moving picture data are input to the moving picture data encoder 3 one frame at a time. A subject image of a frame of a prescribed ordinal number (the $50^{th}$ frame in the above-described example) from a reference frame (initially the $0^{th}$ frame) is subjected to spatial compression, whereby an I-frame is generated, and the subject images in frames other than the frame of the prescribed ordinal number are subjected to temporal processing, whereby P-frames are generated (step 22). The amount of code (amount of data) from the reference frame is accumulated (step 23).

If the accumulated value is equal to or greater than a threshold value (the amount of data capable of being received by the terminal device to which a transmission is to be made) ("NO" at step 24), then the moving picture data of the I-frames and P-frames generated thus far cannot be received by the transmission-target terminal device even if this data is transmitted to the transmission-target terminal device. Therefore, as mentioned above, with regard to the last frame, which is that in which the accumulated value has exceeded the threshold value owing to application of compression, this frame is made an I-frame, which is the leading frame of the next partitioned moving picture file, and serves as a reference frame. Frames up to the frame preceding the last frame become the initial partitioned moving picture file. If 300 KB is exceeded owing to compression of the $145^{th}$ frame, frames up to the $144^{th}$ frame become the first partitioned moving picture file and the $145^{th}$ frame becomes the initial frame of the next moving picture file, as illustrated in FIG. 2.

The I-frame at the beginning of the next partitioned moving picture file is adopted as the reference frame (step 26), the accumulated value is reset and the processing of steps 22 to 26 is repeated until the final frame of the original image is reached (step 27).

Figure 5:
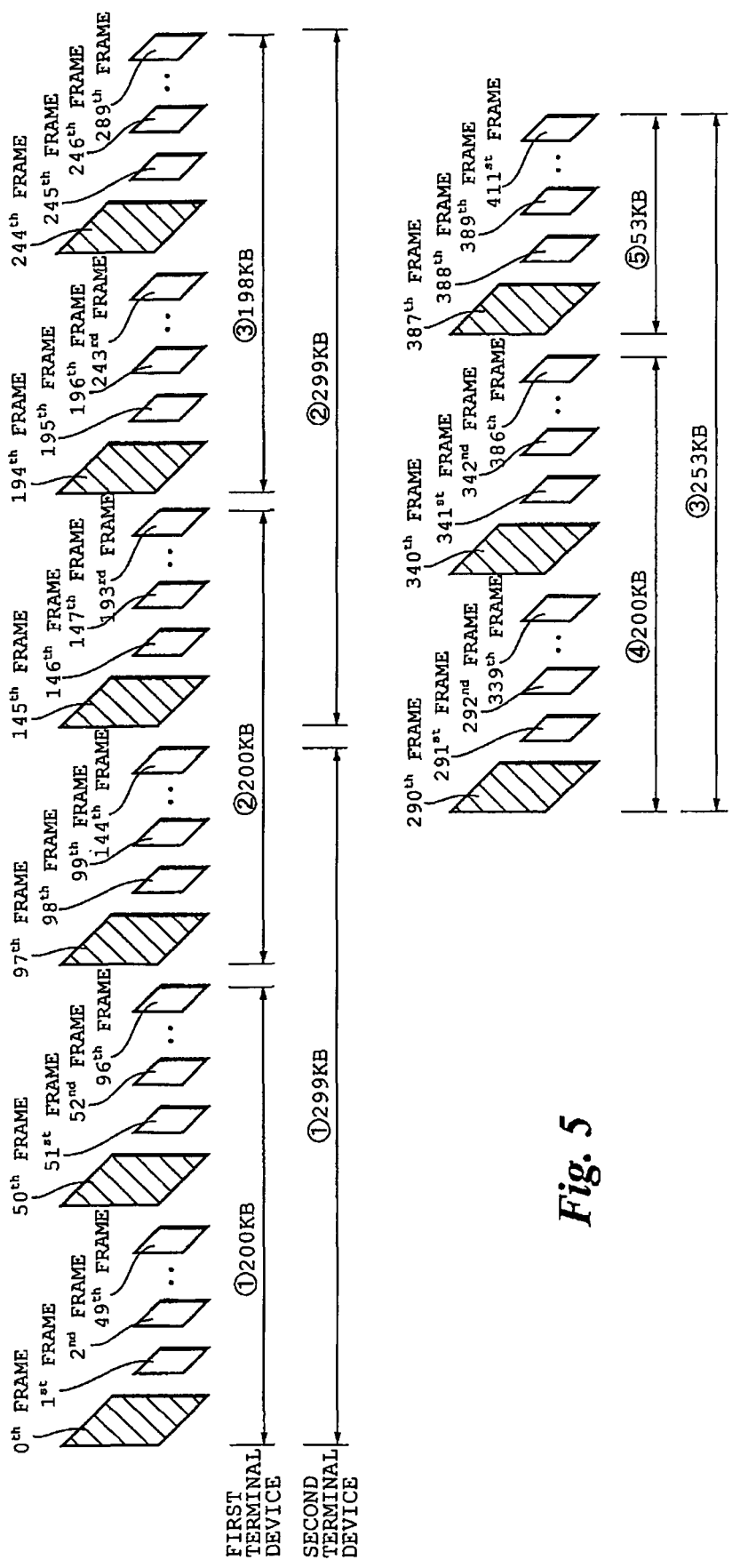
FIG. 5 illustrates an example of a scheme for compressing a moving picture.
Figure 6:
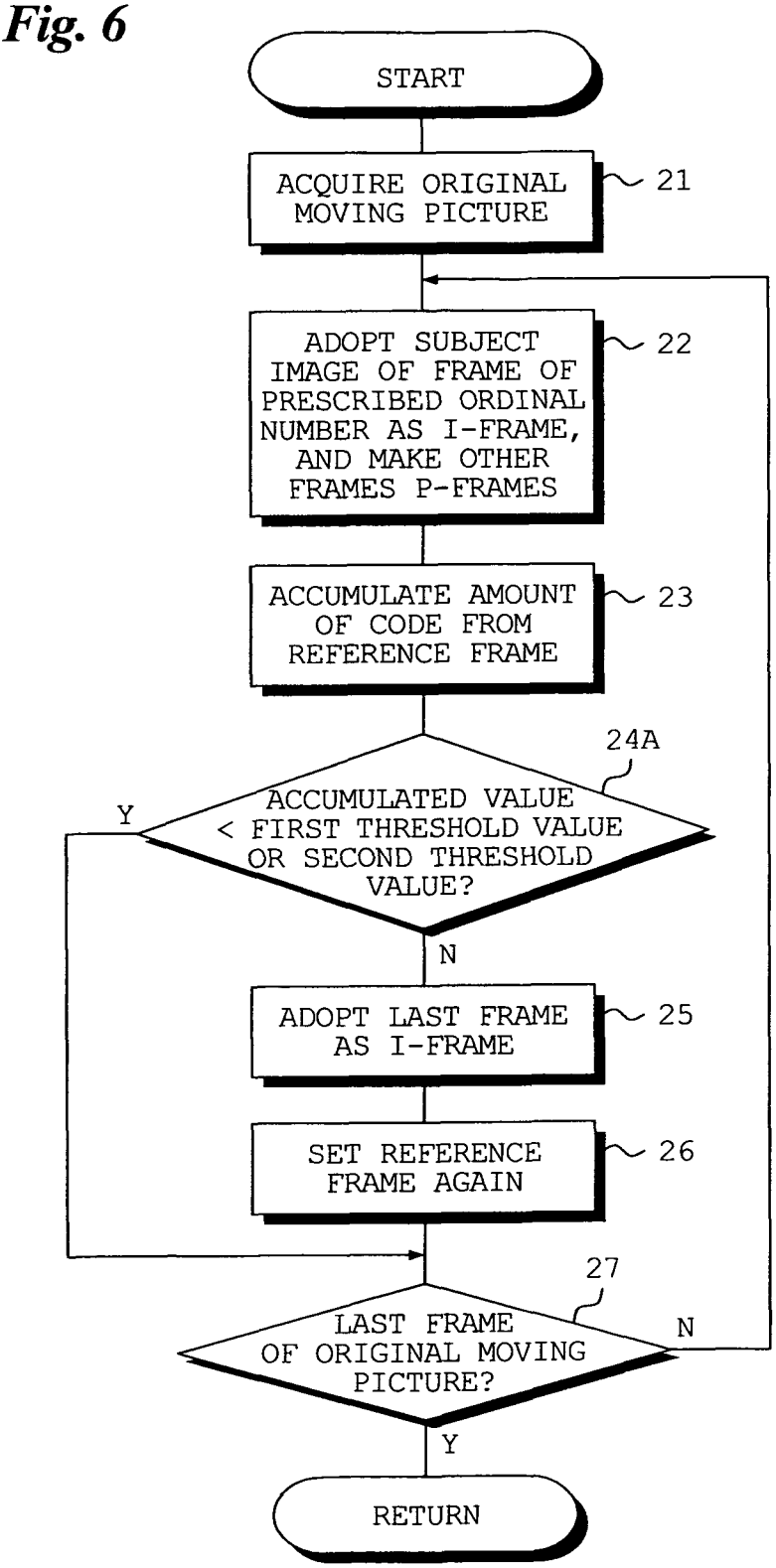
FIG. 6 is a flowchart illustrating processing executed by an apparatus for compressing a moving picture.

FIGS. 5 and 6 illustrate another embodiment of the present invention. In the above-described embodiment, partitioned moving picture files are generated with regard to one type of terminal device to which a transmission is to be made. In the embodiment illustrated next, however, partitioned moving picture files are generated with regard to two types of terminal device to which a transmission is to be made.

FIG. 5 is a conceptual view of a moving picture that has been compressed.

In a manner similar to that described above, it is assumed that the amount of data in an I-frame is 5 KB, the amount of data in a P-frame in 2 KB, the maximum amount of data that can be received by a first terminal device is 200 KB and the maximum amount of data that can be received by a second terminal device is 300 KB. In principle, an I-frame is inserted every 50 frames.

The amount of data in the $0^{th}$ frame is 5 KB, the amount of data from the $1^{st}$ frame to the $49^{th}$ frames is 98 KB, the amount of data in the $50^{th}$ frame is 5 KB, and the amount of data from the $51^{st}$ to the $96^{th}$ frames is 92 KB. The total amount of data from the $0^{th}$ frame to the $96^{th}$ frame is 200 KB. Since the maximum amount of data that can be received by the first terminal device is 200 KB, the frames from the 0th frame to the 96th frame become the first partitioned moving picture file for the first terminal device. The 97th frame is adopted as an I-frame since it is the leading frame of the next partitioned moving picture file.

The amount of data in the 97th frame is 5 KB and the amount of data from the 98th frame to the 144th frame is 94 KB. The total amount of data from the 0th frame to the 144th frame is 299 KB. The frames from the 0th frame to the 144th frame become the first partitioned moving picture file for the second terminal device. The 145th frame is adopted as an I-frame since it is the leading frame of the next partitioned moving picture file.

Similarly, the total amounts of data from the 97th frame to 193rd frame, from the 194th frame to the 289th frame and from the 290th frame to the 386th frame are each 200 KB, and these sets of frames become second, third and fourth partitioned moving picture files, respectively, for the first terminal device. The total amount of data from the 387th frame to the 411th frame is 53 KB, and these frames constitute a fifth partitioned moving picture file. Thus, five partitioned moving picture files are generated as partitioned files for the first terminal device.

Similarly, with regard to the second terminal device, the total amount of data from the 145th frame to the 289th frame is 299 KB and these frames constitute the second partitioned moving picture file. The total amount of data from the 290th frame to the 411th frame is 253 KB and these frames constitute the third partitioned moving picture file. Thus, three partitioned moving picture files are generated as partitioned files for the second terminal device.

FIG. 6 is a flowchart illustrating processing executed by the moving picture compression apparatus according to this embodiment. Processing steps in FIG. 6 identical with those shown in FIG. 4 are designated by like step numbers and need not be described again.

In the processing described above, a single threshold value is compared with the accumulated value (step 24 in FIG. 4). In this embodiment, however, two threshold values, namely the above-mentioned amount of data that can be received by the first terminal device and the amount of data that can be received by the second terminal device, are compared with the accumulated value (step 24A). If the accumulated value is equal to or greater than either of these threshold values ("NO" at step 24A), then the last frame, which is that in which the accumulated value has exceeded the threshold value owing to application of compression, is made an I-frame (step 25), and frames up to the frame preceding the last frame become the partitioned moving picture file.

In the foregoing embodiments, the amount of data in an I-frame is considered to be a uniform 5 KB and the amount of data in a P-frame is considered to be a uniform 2 KB in order to facilitate understanding of the present invention. However, it goes without saying that these amounts of data need not necessarily be uniform. Further, the ratio between I-frames and P-frames may differ depending upon the moving picture.

Furthermore, transmission is not limited to terminal devices of two types; a transmission may be made to three or more types of terminal devices. In addition, the leading frame of a partitioned moving picture file may be made an I-frame.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
    a compressing device for executing complete compression processing if subject-image data represents a subject image of a frame of a prescribed ordinal number from a reference frame, and for executing differential compression processing if subject-image data does not represent a subject image of a frame of a prescribed ordinal number;
    an accumulating device for accumulating an amount of data from the reference frame, wherein the amount of data is the amount of subject-image data that has undergone complete compression processing and differential compression processing;
    a determining device for determining whether an accumulated value obtained from said accumulating device has exceeded a value calculated from an amount of data receivable by a terminal device to which a moving picture file is to be transmitted; and
    a control device, responsive to a determination by said determination device, for controlling said compressing device in such a manner that complete compression processing is applied to subject-image data representing a subject image of a frame that has exceeded the receivable amount of data owing to execution of compression processing;
    wherein said determining device determines whether the accumulated value obtained from said accumulating device has exceeded a first amount of data receivable by a first terminal device to which a moving picture file is to be transmitted, or a second amount of data receivable by a second terminal device to which a moving picture file is to be transmitted; and
    said control device has:
        a first control device for controlling said compressing device in such a manner that complete compression processing is applied to subject-image data representing a subject image of a frame that has exceeded the first receivable amount of data owing to execution of compression processing; and
        a second control device for controlling said compressing device in such a manner that complete compression processing is applied to subject-image data representing a subject image of a frame that has exceeded the second receivable amount of data owing to execution of compression processing;
    wherein the reference frame begins a first partition, the frame that has exceeded the first receivable amount of data begins a second partition, a last frame before the frame that has exceeded the first receivable amount of data ends the first partition, and the first partition comprises more than one frame to which complete compression processing has been applied.

2. The apparatus of claim 1, wherein the first partition and the second partition have equal numbers of frames.

3. The apparatus of claim 1, wherein the first partition and the second partition have non-equal numbers of frames.

4. The apparatus of claim 1, wherein execution of the complete compression processing is associated with an I frame.

5. The apparatus of claim 1, wherein execution of the differential compression processing is associated with a P frame.

6. The apparatus of claim 1, wherein the first partition includes a first I frame and a second I frame associated with different amounts of data.

7. The apparatus of claim 1, wherein the first partition includes a first P frame and a second P frame associated with different amounts of data.

8. The apparatus of claim 1, further comprising a database including specifications regarding the first receivable amount of data of the first terminal device to which the moving picture file is to be transmitted and the second receivable amount of data of the second terminal device to which the moving picture file is to be transmitted.

9. The apparatus of claim 1, wherein the first terminal device and the second terminal device are associated with different terminal device types.

10. The apparatus of claim 1, wherein the first terminal device is configured to transmit the moving picture file.

11. A computer implemented method comprising:
   executing, by a compressing device, complete compression processing if subject-image data represents a subject image of a frame of a prescribed ordinal number from a reference frame, and executing, by the compressing device, differential compression processing if subject-image data does not represent a subject image of a frame of a prescribed ordinal number;
   accumulating, by an accumulating device, an amount of data from the reference frame, wherein the amount of data is the amount of subject-image data that has undergone complete compression processing and differential compression processing;
   determining, by a determining device, whether an accumulated value obtained from said accumulating device has exceeded a value calculated from an amount of data receivable by a terminal device to which a moving picture file is to be transmitted; and
   in response to a determination by said determination device, controlling said compressing device in such a manner that complete compression processing is applied to subject-image data representing a subject image of a frame that has exceeded the receivable amount of data owing to execution of compression processing;
   wherein said determining comprises determining whether the accumulated value obtained from said accumulating device has exceeded a first amount of data receivable by a first terminal device to which a moving picture file is to be transmitted, or a second amount of data receivable by a second terminal device to which a moving picture file is to be transmitted; and
   wherein said controlling comprises:
      controlling, by a first control device, said compressing device in such a manner that complete compression processing is applied to subject-image data representing a subject image of a frame that has exceeded the first receivable amount of data owing to execution of compression processing; and
      controlling, by a second control device, said compressing device in such a manner that complete compression processing is applied to subject-image data representing a subject image of a frame that has exceeded the second receivable amount of data owing to execution of compression processing;
   wherein the reference frame begins a first partition, the frame that has exceeded the first receivable amount of data begins a second partition, a last frame before the frame that has exceeded the first receivable amount of data ends the first partition, and the first partition comprises more than one frame to which complete compression processing has been applied.

12. The method of claim 11, further comprising:
   transmitting the first partition and the second partition to the first terminal device.

13. The method of claim 11, further comprising:
   accessing a database to determine the first receivable amount of data of the first terminal device and the second receivable amount of data of the second terminal device.

14. The method of claim 11, wherein the first partition and the second partition have non-equal numbers of frames.

15. The method of claim 11, wherein the first partition includes a first I frame and a second I frame associated with different amounts of data.

16. The method of claim 11, wherein execution of the complete compression processing is associated with an I frame.

17. A non-transitory computer storage medium storing computer-executable instructions that, when executed, cause a computer system to perform a computer-implemented method comprising:
   executing complete compression processing if subject-image data represents a subject image of a frame of a prescribed ordinal number from a reference frame, and executing, by the compressing device, differential compression processing if subject-image data does not represent a subject image of a frame of a prescribed ordinal number;
   accumulating an amount of data from the reference frame, wherein the amount of data is the amount of subject-image data that has undergone complete compression processing and differential compression processing;
   determining whether an accumulated value obtained from said accumulating device has exceeded a value calculated from an amount of data receivable by a terminal device to which a moving picture file is to be transmitted; and
   in response to a determination by said determination device, controlling said compressing device in such a manner that complete compression processing is applied to subject-image data representing a subject image of a frame that has exceeded the receivable amount of data owing to execution of compression processing;
   wherein said determining comprises determining whether the accumulated value obtained from said accumulating device has exceeded a first amount of data receivable by a first terminal device to which a moving picture file is to be transmitted, or a second amount of data receivable by a second terminal device to which a moving picture file is to be transmitted; and
   wherein said controlling comprises:
      controlling said compressing device in such a manner that complete compression processing is applied to subject-image data representing a subject image of a frame that has exceeded the first receivable amount of data owing to execution of compression processing; and
      controlling said compressing device in such a manner that complete compression processing is applied to subject-image data representing a subject image of a frame that has exceeded the second receivable amount of data owing to execution of compression processing;
   wherein the reference frame begins a first partition, the frame that has exceeded the first receivable amount of data begins a second partition, a last frame before the frame that has exceeded the first receivable amount of data ends the first partition, and the first partition comprises more than one frame to which complete compression processing has been applied.

18. The non-transitory computer storage medium of claim 17, wherein the computer-implemented method further comprises accessing a database to determine the first receivable amount of data of the first terminal device and the second receivable amount of data of the second terminal device.

19. The non-transitory computer storage medium of claim 17, wherein the first partition includes a first I frame and a second I frame associated with different amounts of data.

20. The non-transitory computer storage medium of claim 17, wherein execution of the complete compression processing is associated with an I frame.

* * * * *